United States Patent
Salter et al.

(10) Patent No.: US 9,604,568 B1
(45) Date of Patent: Mar. 28, 2017

(54) VEHICLE LIGHT SYSTEM

(71) Applicant: Ford Global Technologies, LLC, Dearborn, MI (US)

(72) Inventors: Stuart C. Salter, White Lake, MI (US); Christopher Anthony Danowski, Rochester, MI (US); James J. Surman, Clinton Township, MI (US); Paul Kenneth Dellock, Northville, MI (US); Pietro Buttolo, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/254,543

(22) Filed: Sep. 1, 2016

(51) Int. Cl.
| F21V 11/00 | (2015.01) |
| B60Q 1/32 | (2006.01) |
| B60Q 1/26 | (2006.01) |
| F21V 9/16 | (2006.01) |

(52) U.S. Cl.
CPC ........... B60Q 1/323 (2013.01); B60Q 1/2619 (2013.01); *B60Q 2400/40* (2013.01); *F21V 9/16* (2013.01)

(58) Field of Classification Search
CPC ...... B60Q 1/26; B60Q 1/2619; B60Q 1/2661; B60Q 1/2669; B60Q 1/2696; B60Q 1/30; B60Q 1/323; B60Q 1/50; B60Q 1/503; B60Q 1/56; B60Q 2400/40
USPC ................. 362/485, 487, 497, 501, 509–510
See application file for complete search history.

(56) References Cited

U.S. PATENT DOCUMENTS

| 5,053,930 | A | * | 10/1991 | Benavides | ............... B60Q 1/32 250/465.1 |
|---|---|---|---|---|---|
| 5,709,453 | A | | 1/1998 | Krent et al. | |
| 6,031,511 | A | | 2/2000 | DeLuca et al. | |
| 6,117,362 | A | | 9/2000 | Yen et al. | |
| 6,494,490 | B1 | | 12/2002 | Trantoul | |
| 6,577,073 | B2 | | 6/2003 | Shimizu et al. | |
| 6,729,738 | B2 | | 5/2004 | Thompson et al. | |
| 6,737,964 | B2 | | 5/2004 | Samman et al. | |
| 6,773,129 | B2 | | 8/2004 | Anderson, Jr. et al. | |
| 6,820,888 | B1 | | 11/2004 | Griffin | |
| 6,851,840 | B2 | | 2/2005 | Ramamurthy et al. | |
| 6,859,148 | B2 | | 2/2005 | Miller | |
| 6,871,986 | B2 | | 3/2005 | Yamanaka et al. | |
| 6,953,536 | B2 | | 10/2005 | Yen et al. | |
| 6,990,922 | B2 | | 1/2006 | Ichikawa et al. | |
| 7,161,472 | B2 | | 1/2007 | Strumolo et al. | |
| 7,213,923 | B2 | | 5/2007 | Liu et al. | |
| 7,264,366 | B2 | | 9/2007 | Hulse | |
| 7,264,367 | B2 | | 9/2007 | Hulse | |
| 7,441,914 | B2 | | 10/2008 | Palmer et al. | |

(Continued)

FOREIGN PATENT DOCUMENTS

| CN | 101337492 A | 1/2009 |
| CN | 201169230 Y | 2/2009 |

(Continued)

*Primary Examiner* — Jason Moon Han
(74) *Attorney, Agent, or Firm* — Jason Rogers; Price Heneveld LLP

(57) ABSTRACT

A vehicle having a trim housing disposed on the vehicle and partially concealing a latch is provided herein. A light projector is disposed within the trim housing and is configured to illuminate a lighted image pattern on a surface of the vehicle. The image pattern is configured to provide assistance in locating a switch.

20 Claims, 10 Drawing Sheets

(56) References Cited

U.S. PATENT DOCUMENTS

| | | |
|---|---|---|
| 7,501,749 B2 | 3/2009 | Takeda et al. |
| 7,575,349 B2 | 8/2009 | Bucher et al. |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,071,988 B2 | 12/2011 | Lee et al. |
| 8,097,843 B2 | 1/2012 | Agrawal et al. |
| 8,136,425 B2 | 3/2012 | Bostick |
| 8,163,201 B2 | 4/2012 | Agrawal et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,286,378 B2 | 10/2012 | Martin et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,876,352 B2 | 11/2014 | Robbins et al. |
| 8,952,341 B2 | 2/2015 | Kingsley et al. |
| 9,006,751 B2 | 4/2015 | Kleo et al. |
| 9,057,021 B2 | 6/2015 | Kingsley et al. |
| 9,065,447 B2 | 6/2015 | Buttolo et al. |
| 9,187,034 B2 | 11/2015 | Tarahomi et al. |
| 9,299,887 B2 | 3/2016 | Lowenthal et al. |
| 2002/0159741 A1 | 10/2002 | Graves et al. |
| 2002/0163792 A1 | 11/2002 | Formoso |
| 2003/0179548 A1 | 9/2003 | Becker et al. |
| 2004/0173446 A1 | 9/2004 | Plana-Bague et al. |
| 2004/0213088 A1 | 10/2004 | Fuwausa |
| 2004/0233677 A1 | 11/2004 | Su et al. |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0285938 A1 | 12/2007 | Palmer et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2010/0007463 A1 | 1/2010 | Dingman et al. |
| 2010/0077805 A1 | 4/2010 | Mueller et al. |
| 2011/0012062 A1 | 1/2011 | Agrawal et al. |
| 2011/0090709 A1 | 4/2011 | Wang |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0170241 A1 | 7/2013 | Lesueur et al. |
| 2013/0335994 A1 | 12/2013 | Mulder et al. |
| 2014/0065442 A1 | 3/2014 | Kingsley et al. |
| 2014/0103258 A1 | 4/2014 | Agrawal et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0138789 A1 | 5/2015 | Singer et al. |
| 2015/0267881 A1 | 9/2015 | Salter et al. |
| 2016/0016506 A1 | 1/2016 | Collins et al. |

FOREIGN PATENT DOCUMENTS

| | | | |
|---|---|---|---|
| CN | 201193011 Y | 2/2009 | |
| CN | 204515890 U | 7/2015 | |
| DE | 4120677 A1 * | 1/1992 | ............... B60Q 1/52 |
| DE | 29708699 U1 | 7/1997 | |
| DE | 10319396 A1 | 11/2004 | |
| DE | 102004032806 B4 | 10/2014 | |
| DE | 102013223730 A1 | 5/2015 | |
| EP | 1060948 B1 | 9/2006 | |
| EP | 1793261 A1 | 6/2007 | |
| EP | 2778209 A1 | 9/2014 | |
| JP | 2000159011 A | 6/2000 | |
| JP | 2007238063 A | 9/2007 | |
| WO | 2006047306 A1 | 5/2006 | |
| WO | 2014068440 A1 | 5/2014 | |

* cited by examiner

VEHICLE LIGHT SYSTEM

FIELD OF THE INVENTION

The present disclosure generally relates to vehicle lighting systems, and more particularly, to vehicle lighting systems employing one or more photoluminescent structures.

BACKGROUND OF THE INVENTION

Illumination arising from the use of photoluminescent structures offers a unique and attractive viewing experience. It is therefore desired to implement such structures in automotive vehicles for various lighting applications.

SUMMARY OF THE INVENTION

According to one embodiment of the present disclosure, a vehicle having a trim housing disposed on the vehicle and partially concealing a latch is disclosed. A light projector is disposed within the trim housing and is configured to illuminate a lighted image pattern on a surface of the vehicle. The image pattern is configured to provide assistance in locating a switch.

According to another embodiment of the present disclosure, a vehicle having a trim housing is disclosed. An actuable vehicle feature and a first light source are disposed within the housing. A membrane is disposed over the vehicle feature and the first light source. The first light source illuminates an image pattern to assist in locating the vehicle feature.

According to yet another embodiment of the present disclosure, a light system for a vehicle is disclosed. The light system includes a housing attached to a vehicle structure. A light source is disposed within the housing and is configured to generate an image pattern on the vehicle structure. A vehicle feature is disposed within and is partially concealed by the housing. The image pattern notifies a user of the vehicle feature location.

These and other embodiments, objects, and features of the present invention will be understood and appreciated by those skilled in the art upon studying the following specification, claims, and appended drawings.

DETAILED DESCRIPTION OF THE PREFERRED EMBODIMENTS

Figure 2:
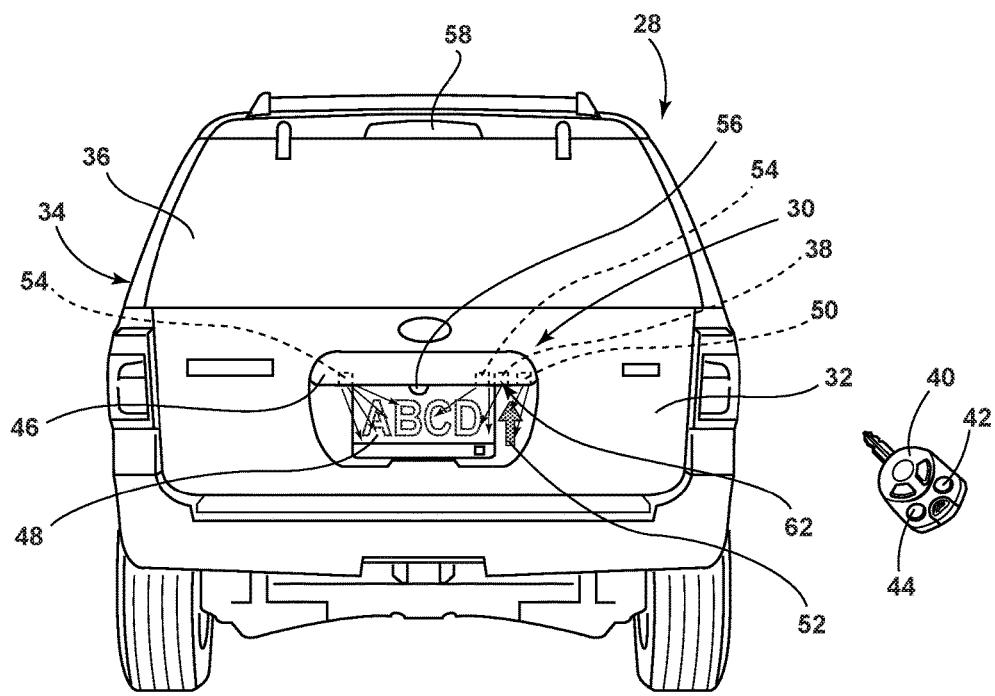
FIG. 2 is a rear perspective view of a vehicle incorporating a light system on a rear portion of the vehicle that may be operable in conjunction with a key fob, according to one embodiment.

For purposes of description herein, the terms "upper," "lower," "right," "left," "rear," "front," "vertical," "horizontal," and derivatives thereof shall relate to the invention as oriented in FIG. 2. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a light system for a vehicle. The light system may advantageously employ one or more photoluminescent structures that are configured to illuminate in response to pre-defined events. The one or more photoluminescent structures may be configured to convert light received from an associated light source and re-emit the light at a different wavelength typically found in the visible spectrum.

Figure 1A:
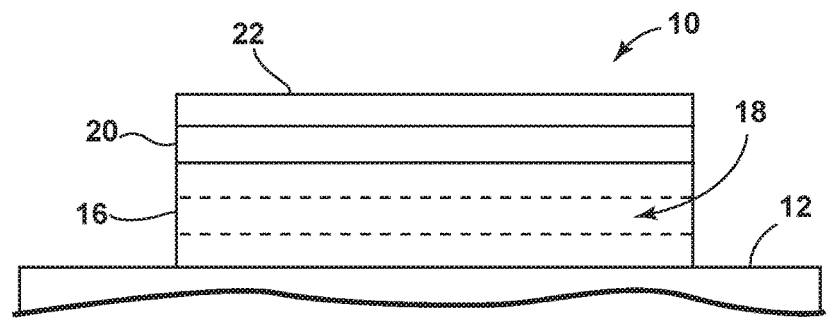
FIG. 1A is aside view of a photoluminescent structure rendered as a coating for use in a photoluminescent latch assembly according to one embodiment.
Figure 1B:
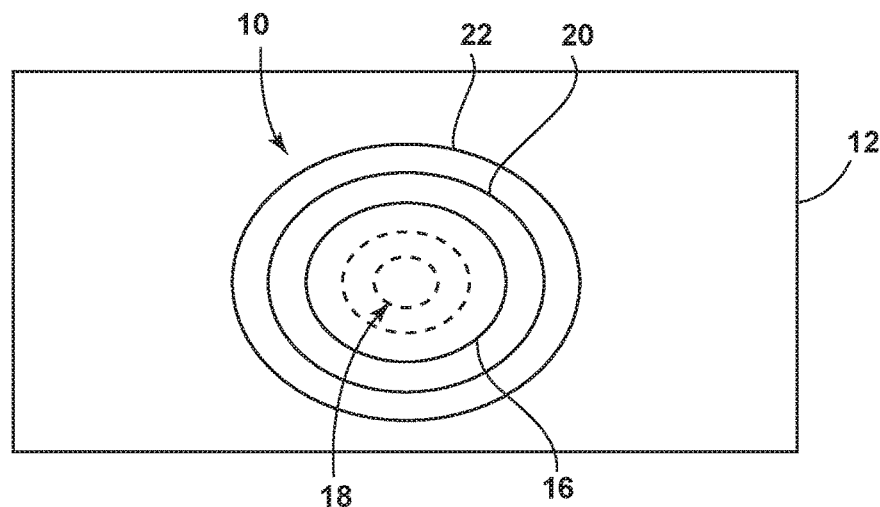
FIG. 1B is a top view of a photoluminescent structure rendered as a discrete particle according to one embodiment.
Figure 1C:
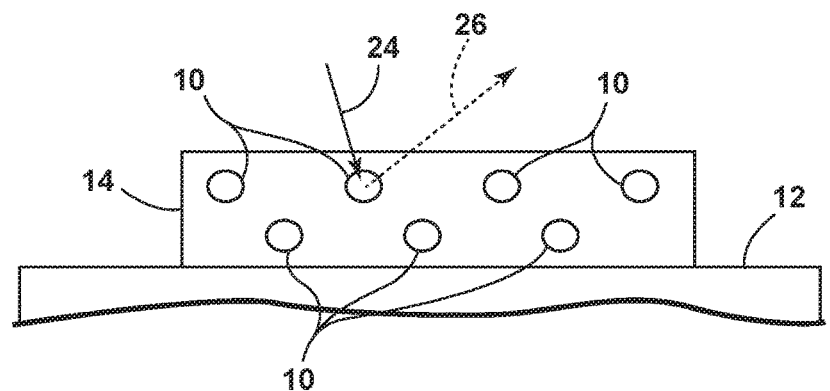
FIG. 1C is a side view of a plurality of photoluminescent structures rendered as discrete particles and incorporated into a separate structure.

Referring to FIGS. 1A-1C, various exemplary embodiments of photoluminescent structures 10 are shown, each capable of being coupled to a substrate 12, which may correspond to a vehicle fixture or vehicle related piece of equipment. In FIG. 1A, the photoluminescent structure 10 is generally shown rendered as a coating (e.g., a film) that may be applied to a surface of the substrate 12. In FIG. 1B, the photoluminescent structure 10 is generally shown as a discrete particle capable of being integrated with a substrate 12. In FIG. 1C, the photoluminescent structure 10 is generally shown as a plurality of discrete particles that may be incorporated into a support medium 14 (e.g., a film) that may then be applied (as shown) or integrated with the substrate 12.

At the most basic level, a given photoluminescent structure 10 includes an energy conversion layer 16 that may include one or more sublayers, which are exemplarily shown through broken lines in FIGS. 1A and 1B. Each sublayer of the energy conversion layer 16 may include one or more photoluminescent materials 18 having energy converting elements with phosphorescent or fluorescent properties. Each photoluminescent material 18 may become excited upon receiving an excitation light 24 of a specific wavelength, thereby causing the light to undergo a conversion process. Under the principle of down conversion, the excitation light 24 is converted into a longer wavelength, converted light 26 that is outputted from the photoluminescent structure 10. Conversely, under the principle of up conversion, the excitation light 24 is converted into a shorter wavelength light that is outputted from the photoluminescent structure 10. When multiple distinct wavelengths of light are outputted from the photoluminescent structure 10 at the same time, the wavelengths of light may mix together and be expressed as a multicolor light.

Light emitted by a projector light source 66 (FIG. 3) is referred to herein as excitation light 24 and is illustrated herein as solid arrows. In contrast, light emitted from the photoluminescent structure 10 is referred to herein as converted light 26 and is illustrated herein as broken arrows. The mixture of excitation light 24 and converted light 26 that may be emitted simultaneously is referred to herein as outputted light.

The energy conversion layer 16 may be prepared by dispersing the photoluminescent material 18 in a polymer matrix to form a homogenous mixture using a variety of methods. Such methods may include preparing the energy conversion layer 16 from a formulation in a liquid carrier support medium 14 and coating the energy conversion layer 16 to a desired substrate 12. The energy conversion layer 16 may be applied to a substrate 12 by painting, screen-printing, spraying, slot coating, dip coating, roller coating, and bar coating. Alternatively, the energy conversion layer 16 may be prepared by methods that do not use a liquid carrier support medium 14. For example, the energy conversion layer 16 may be rendered by dispersing the photoluminescent material 18 into a solid-state solution (homogenous mixture in a dry state) that may be incorporated in a polymer matrix, which may be formed by extrusion, injection molding, compression molding, calendaring, thermoforming, etc. The energy conversion layer 16 may then be integrated into a substrate 12 using any methods known to those skilled in the art. When the energy conversion layer 16 includes sublayers, each sublayer may be sequentially coated to form the energy conversion layer 16. Alternatively, the sublayers can be separately prepared and later laminated or embossed together to form the energy conversion layer 16. Alternatively still, the energy conversion layer 16 may be formed by coextruding the sublayers.

In some embodiments, the converted light 26 that has been down converted or up converted may be used to excite other photoluminescent material(s) 18 found in the energy conversion layer 16. The process of using the converted light 26 outputted from one photoluminescent material 18 to excite another, and so on, is generally known as an energy cascade and may serve as an alternative for achieving various color expressions. With respect to either conversion principle, the difference in wavelength between the excitation light 24 and the converted light 26 is known as the Stokes shift and serves as the principle driving mechanism for an energy conversion process corresponding to a change in wavelength of light. In the various embodiments discussed herein, each of the photoluminescent structures 10 may operate under either conversion principle.

Referring back to FIGS. 1A and 1B, the photoluminescent structure 10 may optionally include at least one stability layer 20 to protect the photoluminescent material 18 contained within the energy conversion layer 16 from photolytic and thermal degradation. The stability layer 20 may be configured as a separate layer optically coupled and adhered to the energy conversion layer 16. Alternatively, the stability layer 20 may be integrated with the energy conversion layer 16. The photoluminescent structure 10 may also optionally include a protective layer 22 optically coupled and adhered to the stability layer 20 or other layer (e.g., the conversion layer 16 in the absence of the stability layer 20) to protect the photoluminescent structure 10 from physical and chemical damage arising from environmental exposure. The stability layer 20 and/or the protective layer 22 may be combined with the energy conversion layer 16 through sequential coating or printing of each layer, sequential lamination or embossing, or any other suitable means.

Additional information regarding the construction of photoluminescent structures 10 is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," the entire disclosure of which is incorporated herein by reference. For additional information regarding fabrication and utilization of photoluminescent materials to achieve various light emissions, refer to U.S. Pat. No. 8,207,511 to Bortz et al., entitled "PHOTOLUMINESCENT FIBERS, COMPOSITIONS AND FABRICS MADE THEREFROM"; U.S. Pat. No. 8,247,761 to Agrawal et al., entitled "PHOTOLUMINESCENT MARKINGS WITH FUNCTIONAL OVERLAYERS"; U.S. Pat. No. 8,519,359 B2 to Kingsley et al., entitled "PHOTOLYTICALLY AND ENVIRONMENTALLY STABLE MULTI-LAYER STRUCTURE FOR HIGH EFFICIENCY ELECTROMAGNETIC ENERGY CONVERSION AND SUSTAINED SECONDARY EMISSION"; U.S. Pat. No. 8,664,624 B2 to Kingsley et al., entitled "ILLUMINATION DELIVERY SYSTEM FOR GENERATING SUSTAINED SECONDARY EMISSION"; U.S. Patent Publication No. 2012/0183677 to Agrawal et al., entitled "PHOTOLUMINESCENT COMPOSITIONS, METHODS OF MANUFACTURE AND NOVEL USES"; U.S. Pat. No. 9,057,021 to Kingsley et al., entitled "PHOTOLUMINESCENT OBJECTS"; and U.S. Pat. No. 8,846,184 to Agrawal et al., entitled "CHROMIC LUMINESCENT OBJECTS," all of which are incorporated herein by reference in their entirety.

According to one embodiment, the photoluminescent material 18 may include organic or inorganic fluorescent dyes including rylenes, xanthenes, porphyrins, and phthalocyanines. Additionally, or alternatively, the photoluminescent material 18 may include phosphors from the group of Ce-doped garnets such as YAG:Ce and may be a short persistence photoluminescent material 18. For example, an emission by $Ce^{3+}$ is based on an electronic energy transition from $4\,D^1$ to $4\,f^1$ as a parity allowed transition. As a result of this, a difference in energy between the light absorption and the light emission by $Ce^{3+}$ is small, and the luminescent level of $Ce^{3+}$ has an ultra-short lifespan, or decay time, of $10^{-8}$ to $10^{-7}$ seconds (10 to 100 nanoseconds). The decay time may be defined as the time between the end of excitation from the excitation light 24 and the moment when the light intensity of the converted light 26 emitted from the photoluminescent structure 10 drops below a minimum visibility of 0.32 mcd/m². A visibility of 0.32 mcd/m² is roughly 100 times the sensitivity of the dark-adapted human eye, which corresponds to a base level of illumination commonly used by persons of ordinary skill in the art.

According to one embodiment, a $Ce^{3+}$ garnet may be utilized, which has a peak excitation spectrum that may reside in a shorter wavelength range than that of conventional YAG:Ce-type phosphors. Accordingly, $Ce^{3+}$ has short persistence characteristics such that its decay time may be 100 milliseconds or less. Therefore, in some embodiments, the rare earth aluminum garnet type Ce phosphor may serve as the photoluminescent material 18 with ultra-short persistence characteristics, which can emit the converted light 26 by absorbing purple to blue excitation light 24 emitted from a light source 54. According to one embodiment, a ZnS:Ag phosphor may be used to create a blue converted light 26. A ZnS:Cu phosphor may be utilized to create a yellowish-green converted light 26. A $Y_2O_2S$:Eu phosphor may be used to create red converted light 26. Moreover, the aforementioned phosphorescent materials may be combined to form a wide range of colors, including white light. It will be understood that any short persistence photoluminescent material known in the art may be utilized without departing from the teachings provided herein. Additional information regarding the production of short persistence photoluminescent materials is disclosed in U.S. Pat. No. 8,163,201 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," the entire disclosure of which is incorporated herein by reference.

Additionally, or alternatively, the photoluminescent material 18, according to one embodiment, disposed within the photoluminescent structure 10 may include a long persistence photoluminescent material 18 that emits the converted light 26, once charged by the excitation light 24. The excitation light 24 may be emitted from any excitation source (e.g., any natural light source, such as the sun, and/or any artificial light source). The long persistence photoluminescent material 18 may be defined as having a long decay time due to its ability to store the excitation light 24 and release the converted light 26 gradually, for a period of several minutes or hours, once the excitation light 24 is no longer present.

The long persistence photoluminescent material 18, according to one embodiment, may be operable to emit light at or above an intensity of 0.32 mcd/m² after a period of 10 minutes. Additionally, the long persistence photoluminescent material 18 may be operable to emit light above or at an intensity of 0.32 mcd/m² after a period of 30 minutes and, in some embodiments, for a period substantially longer than 60 minutes (e.g., the period may extend 24 hours or longer, and in some instances, the period may extend 48 hours). Accordingly, the long persistence photoluminescent material 18 may continually illuminate in response to excitation from any light source 54 that emits the excitation light 24, including, but not limited to, natural light sources (e.g., the sun) and/or any artificial light source 54. The periodic absorption of the excitation light 24 from any excitation source may provide for a substantially sustained charge of the long persistence photoluminescent material 18 to provide for consistent passive illumination. In some embodiments, a light sensor may monitor the illumination intensity of the photoluminescent structure 10 and actuate an excitation source when the illumination intensity falls below 0.32 mcd/m², or any other predefined intensity level.

The long persistence photoluminescent material 18 may correspond to alkaline earth aluminates and silicates, for example doped di-silicates, or any other compound that is capable of emitting light for a period of time once the excitation light 24 is no longer present. The long persistence photoluminescent material 18 may be doped with one or more ions, which may correspond to rare earth elements, for example, $Eu^{2+}$, $Tb^{3+}$ and/or $Dy^3$. According to one non-limiting exemplary embodiment, the photoluminescent structure 10 includes a phosphorescent material in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation.

The photoluminescent structure 10, according to one embodiment, may be a translucent white color, and in some instances reflective, when unilluminated. Once the photoluminescent structure 10 receives the excitation light 24 of a particular wavelength, the photoluminescent structure 10 may emit any color light (e.g., blue or red) therefrom at any desired brightness. According to one embodiment, a blue emitting phosphorescent material may have the structure $Li_2ZnGeO_4$ and may be prepared by a high temperature solid-state reaction method or through any other practicable method and/or process. The afterglow may last for a duration of 2-8 hours and may originate from the excitation light 24 and d-d transitions of $Mn^{2+}$ ions.

According to an alternate non-limiting exemplary embodiment, 100 parts of a commercial solvent-borne polyurethane, such as Mace resin 107-268, having 50% solids polyurethane in toluene/isopropanol, 125 parts of a blue green long persistence phosphor, such as Performance Indicator PI-BG20, and 12.5 parts of a dye solution containing 0.1% Lumogen Yellow F083 in dioxolane may be blended to yield a low rare earth mineral photoluminescent structure 10. It will be understood that the compositions provided herein are non-limiting examples. Thus, any phosphor known in the art may be utilized within the photoluminescent structure 10 without departing from the teachings provided herein. Moreover, it is contemplated that any long persistence phosphor known in the art may also be utilized without departing from the teachings provided herein.

Additional information regarding the production of long persistence photoluminescent materials is disclosed in U.S. Pat. No. 8,163,201 to Agrawal et al., entitled "HIGH-INTENSITY, PERSISTENT PHOTOLUMINESCENT FORMULATIONS AND OBJECTS, AND METHODS FOR CREATING THE SAME," the entire disclosure of which is incorporated herein by reference. For additional information regarding long persistence phosphorescent structures, refer to U.S. Pat. No. 6,953,536 to Yen et al., entitled "LONG PERSISTENT PHOSPHORS AND PERSISTENT ENERGY TRANSFER TECHNIQUE"; U.S. Pat. No. 6,117,362 to Yen et al., entitled "LONG-PERSISTENT BLUE PHOSPHORS"; and U.S. Pat. No. 8,952,341 to Kingsley et al., entitled "LOW RARE EARTH MINERAL PHOTOLUMINESCENT COMPOSITIONS AND STRUCTURES FOR GENERATING LONG-PERSISTENT LUMINESCENCE," all of which are incorporated herein by reference in their entirety.

Referring to FIG. 2, an automotive vehicle 28 is generally illustrated employing a vehicle light system, according to one embodiment. The vehicle 28 shown is one example of a passenger vehicle having a rear tailgate 32 mounted on a rear portion 34 of the vehicle 28, as is generally known in the art. The rear tailgate 32 includes a rear window 36. The rear tailgate 32 and/or the rear window 36 may be movable between a closed position, as illustrated, and an open position through the utilization of a hinge assembly. A latch release switch 38, or other vehicle feature, is disposed within a trim housing 46 and is operably coupled with a latch mechanism to enable a user to engage and release the latch mechanism to open the tailgate 32 for access to the vehicle 28, as is known in the art. A remote key fob 40 is shown which may be operated by a user to activate various features including door lock and unlock signals 42, 44. The latch release switch 38 may be a mechanical handle or an electrical release that is actuated through any type of switch known in the art, such as a push button. Additionally, and/or alternatively, the latch release switch 38 may be configured as a switch that is operably coupled with a vehicle locking system to allow and prevent opening of one or more vehicle doors. Further, the latch release switch 38 may be replaced with any other switch 62 to control a vehicle feature without departing from the teachings provided herein.

The light system 30 is shown installed within the exterior rearward facing trim housing 46, generally in close proximity to a license plate 48. The trim housing 46 may be integrally formed with the tailgate 32 or later attached thereto. The light system 30 includes a light projector 50 that is configured to provide a lighted image pattern 52 along a portion of the rear tailgate 32. For example, the light projector 50 may provide a location of the concealed latch release switch 38 to a user. Additionally, or alternatively, the light projector 50 may project any customized message onto the vehicle 28 that a user desires. It will be appreciated that the light system provided herein may be located at different locations on the vehicle 28 and illuminate any vehicle feature, such as on a vehicle door handle, a door, a side fender, a bumper, a roof rail, a grille assembly, or any other location sufficient to project a lighted image pattern 52 onto a surface of the vehicle 28. It will further be appreciated that other images having different patterns, sizes, and light colors may be generated.

The light system 30 may be activated in response to a user activating a door unlock 44, or unlatch, switch on the key fob 40 when the user is within signal communication range of the vehicle 28. Upon activation of the door unlock 44 switch or button, the light system 30 is turned on to generate the lighted image pattern 52 along the rear tailgate 32, such as an arrow 90 indicating the location of the latch release switch 38. The light system 30 may remain on for a predetermined time period, such as two minutes, and may be turned off prior to the predetermined time period when the latch mechanism is activated. Accordingly, the appearance of the lighted image pattern 52 provides assistance in locating a feature disposed within and/or in close proximity to the light system 30. The light system 30 may also include feature light source(s) 54 that may be configured to illuminate a feature of the vehicle 28 that is disposed in close proximity to the light system 30. For example, the feature light source(s) 54 may illuminate the license plate 48 and/or provide illumination for a rearwardly facing imaging device 56. Additionally, or alternatively, the feature light source(s) 54 may illuminate a vehicle handle, bumper, and/or hitch assembly. With respect to the present embodiment, the light system 30 may be provided to supplement existing lighting on the vehicle 28 or may be provided as a substitute thereof. For example, the light system 30 described above may replace a conventional center high-mount stop lamp (CHMSL) 58.

Figure 3:
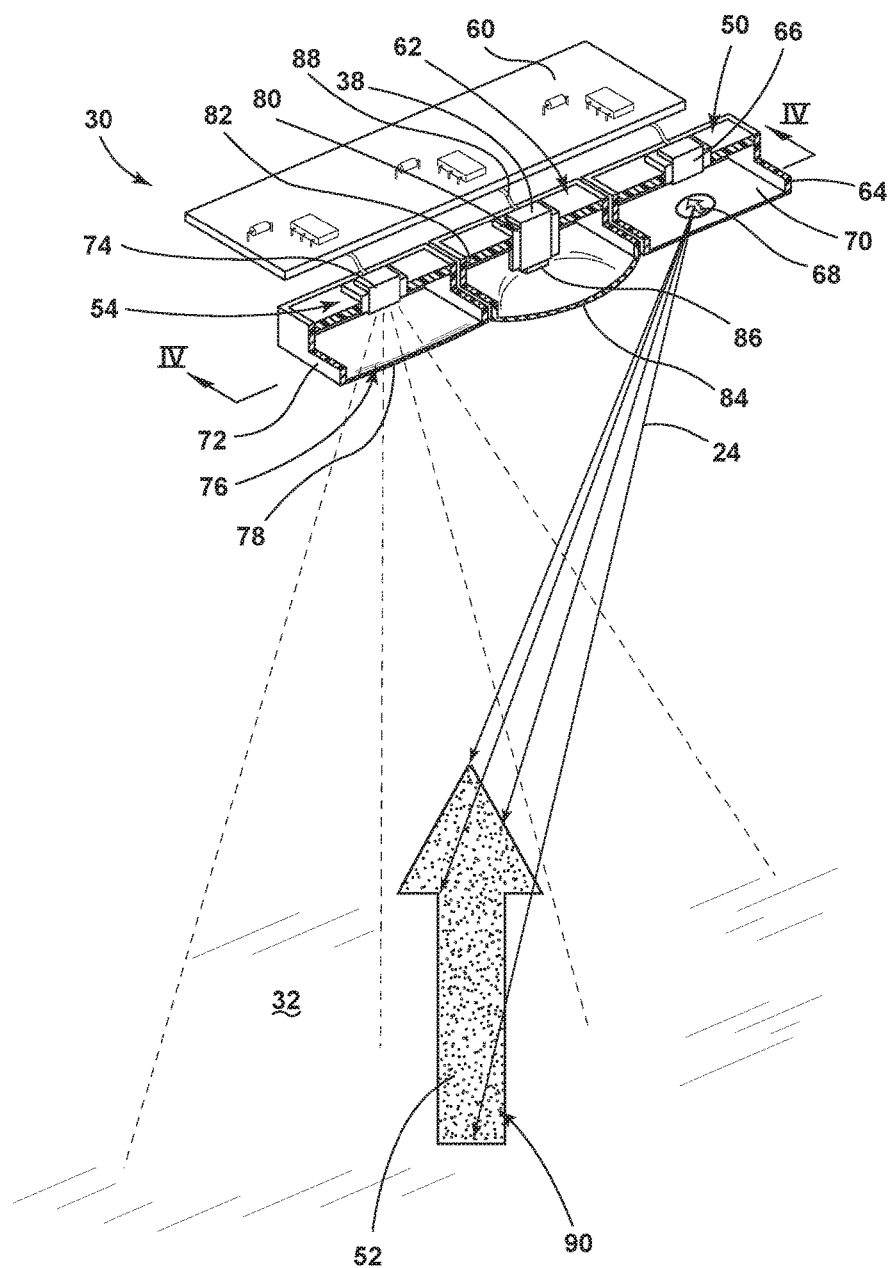
FIG. 3 is an enlarged view of the light system illustrating the projection of a lighted image pattern, according to one embodiment.
Figure 4:
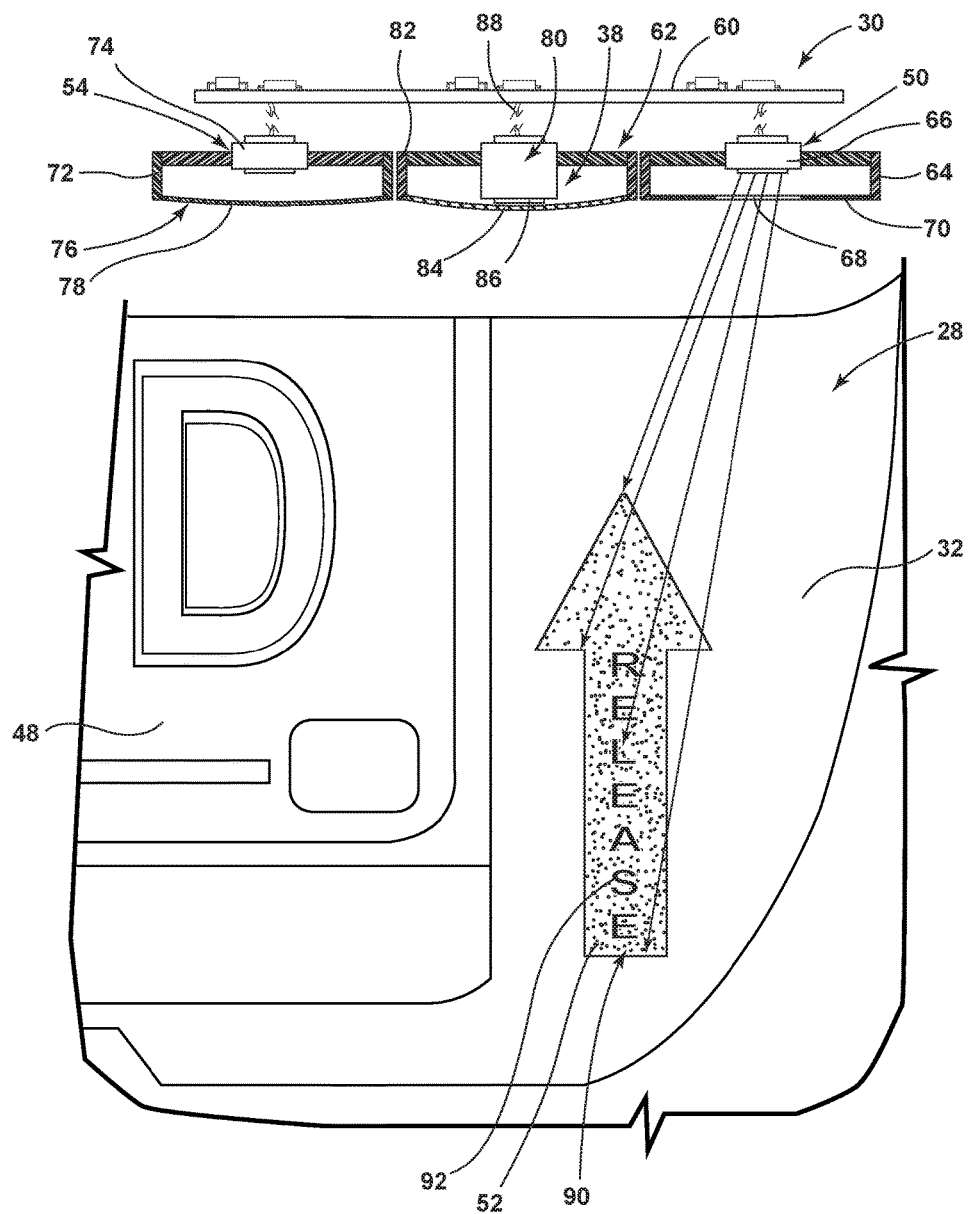
FIG. 4 is a cross-sectional view taken along the line IV-IV of FIG. 3 further illustrating the light system, according to one embodiment.

Referring to FIGS. 3 and 4, the light system 30 is further illustrated having the light projector 50 for generating a lighted image pattern 52 operably coupled with a printed circuit board (PCB) 60 having control circuitry including drive circuitry for controlling activation and deactivation of the light projector 50, the latch release switch 38, and/or the feature light source(s) 54. The PCB 60 may be any type of circuit board including, but not limited to, any flexible PCB and/or rigid PCB and may be arranged in a linear array. However, the light projector 50 may be slightly angled relative to latch release switch 38 so as to provide light illumination below the latch release switch 38.

The light projector 50 includes a housing 64, a projector light source 66, and an image filter 68. The projector light source 66 and feature light source(s) 54 may comprise any form of light source. For example fluorescent lighting, light emitting diodes (LEDs), organic LEDs (OLEDs), polymer LEDs (PLEDs), solid state lighting, or any other form of lighting configured to emit light may be utilized. According to one embodiment, the projector light source 66 may be configured to emit a wavelength of excitation light 24 that is characterized as ultraviolet light (~10-400 nanometers in wavelength), violet light (~380-450 nanometers in wavelength), blue light (~450-495 nanometers in wavelength), and/or infrared light (IR) (~700 nm-1 mm in wavelength) to take advantage of the relative low cost attributable to those types of LEDs.

The image filter 68 is arranged within a light output window 70 of the corresponding projector light source 66 such that light output by the projector light source 66 is illuminated onto and passes through the image filter 68 to provide the lighted image pattern 52 projecting onto the tailgate 32. The image filter 68 may include a light transparent film having either a positive or negative light transparent image. The feature light source(s) 54 includes a housing 72, a light source 74, and a light output window 76 that may include optics 78. The optics 78 may assist in directing excitation light 24 towards the photoluminescent structure 10.

The latch release switch 38, which could also be a mechanical type handle, is illustrated by example only as including an electrical switch 80 mounted within a latch housing 82 that is disposed in, or integrally formed with, the trim housing 46. Accordingly, the latch release switch 38 may be substantially concealed from a user as the user approaches the vehicle 28. A membrane 84 is provided as a seal over the switch 80. Depression of the membrane 84 causes depression of a plunger 86 on the switch 80. Internal switch contacts then change positions to provide an output signal on output wires 88 to a controller, as described herein. The latch mechanism includes a pivotal claw, not shown, which is moved between open and closed positions by an actuator in the latch mechanism. In a closed position, the claw engages a striker fixedly mounted on the vehicle 28. The claw, when engaging the striker, pulls the bottom end of the tailgate 32 into sealed engagement in a closed position. Pivotal movement of the claw in the opposite direction releases the claw from the striker allowing the bottom edge of the tailgate 32 to be pivoted to the open position with respect to the vehicle 28.

In FIGS. 3 and 4, the light projector 50 is shown activated such that the projector light source 66 illuminates light onto the image filter 68 to generate the lighted image pattern 52 on the vehicle 28. As illustrated, the lighted image pattern 52 is configured as an arrow 90 that directs a user towards the latch release switch 38 of the vehicle 28. The image pattern 52 may further include indicia 92 within the pattern, such as "release" indicating to a user of the light system 30 where the latch release switch 38 is located for the latch mechanism.

Figure 5:
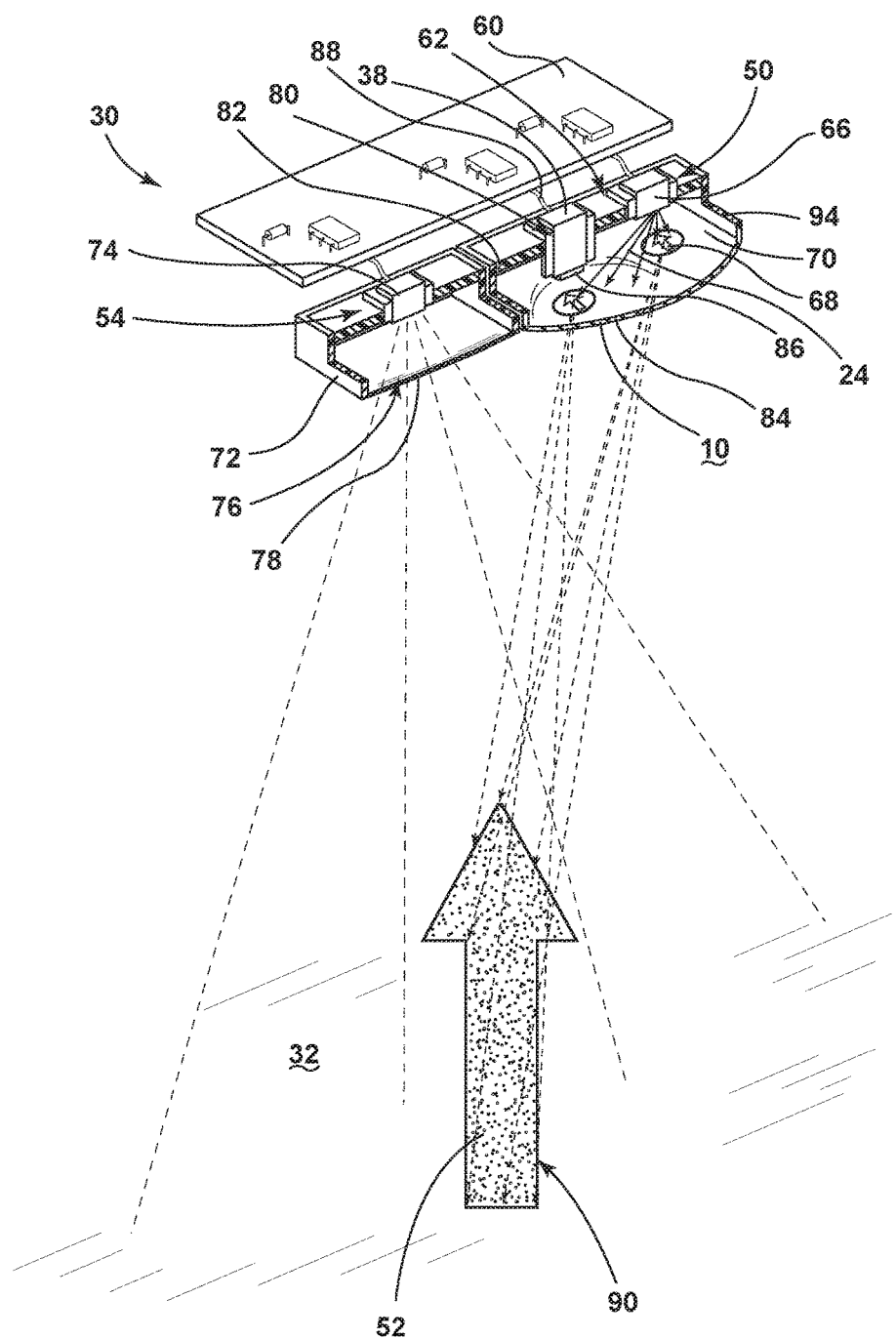
FIG. 5 is an enlarged view of the light system illustrating a light projector integrally formed with a switch as a single component having a membrane with a photoluminescent structure therein, according to an alternate embodiment.

Referring to FIG. 5, the projector light source 66 and the latch release switch 38 may be disposed within a single illuminated switch housing 94. The latch release switch 38 may extend to a position closer to the membrane 84 than the projector light source 66 thereby protecting the projector light source 66 from contact thereto while a user compresses the membrane 84.

The image filter 68 may include the photoluminescent structure 10 therein and/or thereon that is configured to luminesce in response to receiving excitation light 24 from the projector light source 66. The photoluminescent structure 10 may contain a short persistence photoluminescent material 18 therein that is configured to luminesce quickly after illumination of the projector light source 66 and cease to luminesce quickly after the projector light source 66 is returned to an unilluminated state.

Figure 6:
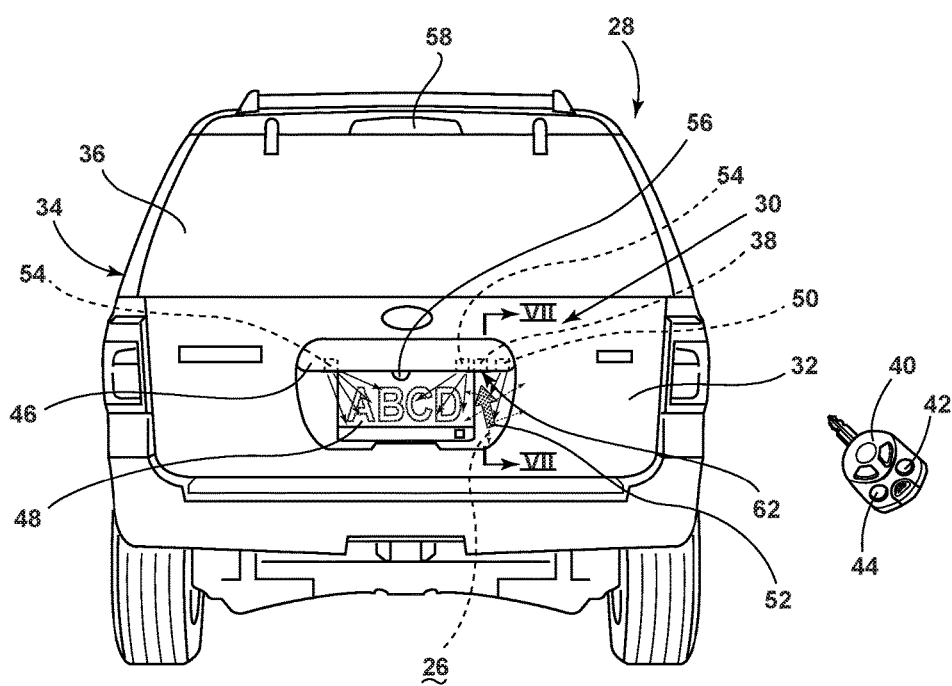
FIG. 6 is a rear perspective view of the vehicle having the photoluminescent structure on a tailgate of the vehicle, according to one embodiment.

Referring to FIG. 6, the image pattern 52 disposed on the tailgate 32 may by defined by the photoluminescent structure 10 that is disposed on the tailgate 32. The photoluminescent structure 10 may be substantially transparent and/or non-visible when the light source 54 is unilluminated. When a corresponding light source 54 is illuminated, the photoluminescent structure 10 may luminesce in response to receiving excitation light 24 from the light source 54 thereby illuminating the lighted image pattern 52.

A wide range of photoluminescent materials 18 that luminesce in response to UV light, or any other wavelength of excitation light 24, may be substantially non-visible in an unexcited state, each of which may be utilized without departing from the scope of the present disclosure. Upon illumination of the projector light source 66, the photoluminescent material 18 may luminesce in the visible portion of the light spectrum. According to one embodiment, the photoluminescent structure 10 may include a mixture of UV light and infrared (IR) light excitable photoluminescent materials 18 therein that are capable of exciting the photoluminescent structure 10.

Figure 7:
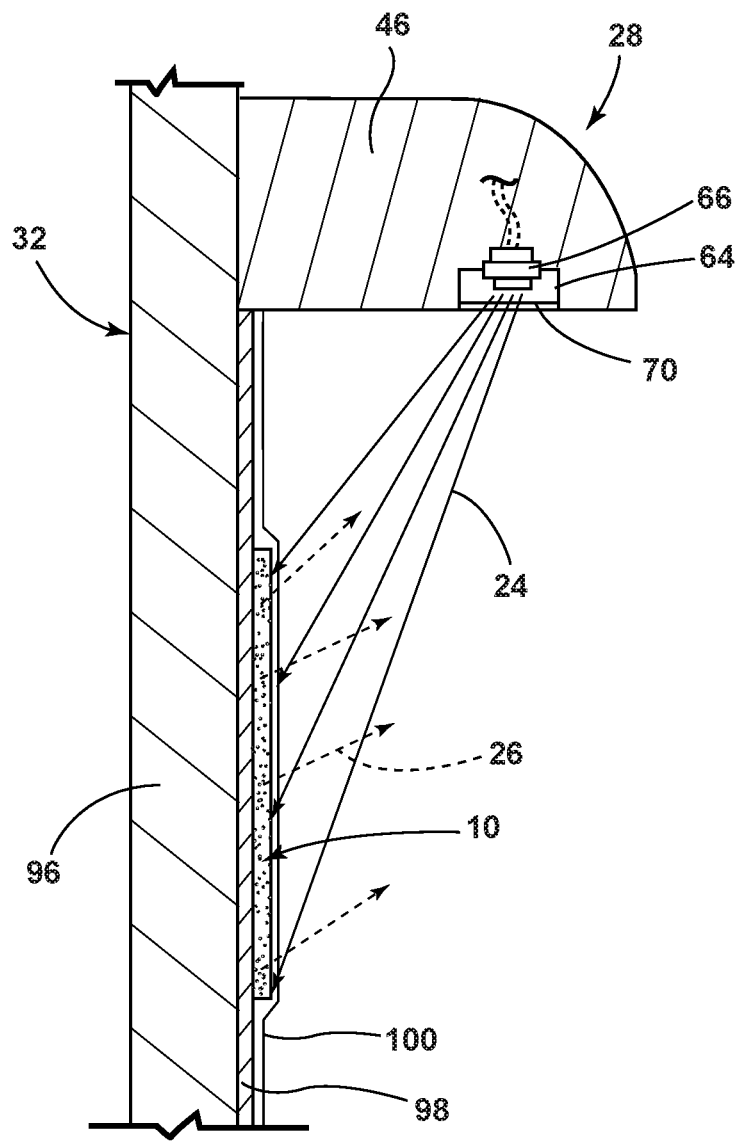
FIG. 7 is a cross-sectional view taken along the line VII-VII of FIG. 6 illustrating the photoluminescent structure disposed below a clear coat, according to one embodiment.
Figure 8:
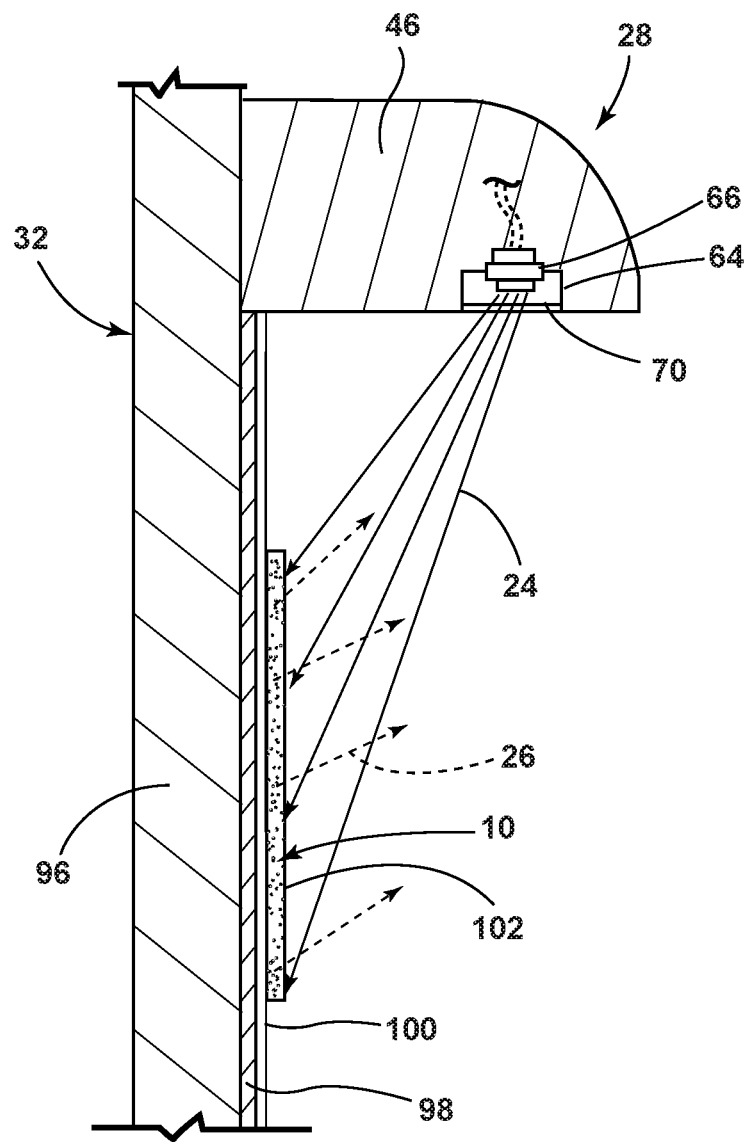
FIG. 8 is a cross-sectional view taken along the line VII-VII of FIG. 6 illustrating the photoluminescent structure configured as an adhesive member that is adhered to the tailgate of the vehicle, according to an alternate embodiment.

Referring to FIGS. 7 and 8, a cross section of the light system 30 is illustrated. The photoluminescent structure 10 may be disposed on the tailgate 32, or any other portion of the vehicle 28, and configured to luminesce in response to receiving excitation light 24 from the first light source. As discussed above, the photoluminescent structure 10 may include a photoluminescent material 18 that is substantially non-visible in the non-luminescent state such that the lighted image pattern 52 on the tailgate 32 is only visible in the luminescent state.

As illustrated in FIG. 7, the tailgate 32 is formed from a base structure 96. A base coat 98 and a clear topcoat 100 are disposed on the base structure 96. The photoluminescent structure 10 is disposed between a base coat 98 and a clear topcoat 100 such that the photoluminescent structure 10 exhibits improved durability. The clear coat may contain one or more stabilizing additives such as a UV light absorbing additive or a hindered amine light stabilizer. Such additives aid in protecting the photoluminescent structure 10 as well as the underlying base coat 98 from long-term exposure to sunlight, protecting the color(s) in the design and providing durability.

According to one embodiment, upon curing, the base coat 98 has a thickness of about 0.4 to 1 mil (about 10 to 25 μm), the photoluminescent structure 10 has a thickness of about 0.01 to 1 mil (about 0.25 to 25 μm), and the clear coat has a thickness of about 1 to 3 mils (about 25 to 75 μm). By providing the photoluminescent structure 10 between the base coat 98 and topcoat 100, the resulting vehicle body, including photoluminescent structure 10, is substantially free of surface discontinuities.

According to one embodiment, the photoluminescent structure 10 may luminesce in a substantially white color in response to receiving excitation light 24, which may be emitted by the projector light source 66 in the blue wavelength spectrum. The projector light source 66 may vary the intensity of the excitation light 24 emitted therefrom such that the intensity of luminescence may also be varied based on a predefined event and/or a user preference. For example, the current may vary from 1 to 5 times the steady state current.

Referring to FIG. 8, a cross section of the light system 30 is illustrated according to an alternate embodiment. As illustrated, the photoluminescent structure 10 is applied to the topcoat 100 as an adhesive-backed member 102. The member 102 may be subjected to a thermal curing step such as by using infrared lamps to ensure that the member 102 is adhered to the clear coat. As discussed above, a plurality of members 102 may be interchangeably adhered to the vehicle clear coat such that a user may dispose a wide range of members 102 on the vehicle 28. The member 102 may provide a notification as to the location of a vehicle feature, or any other desired information.

Figure 9:
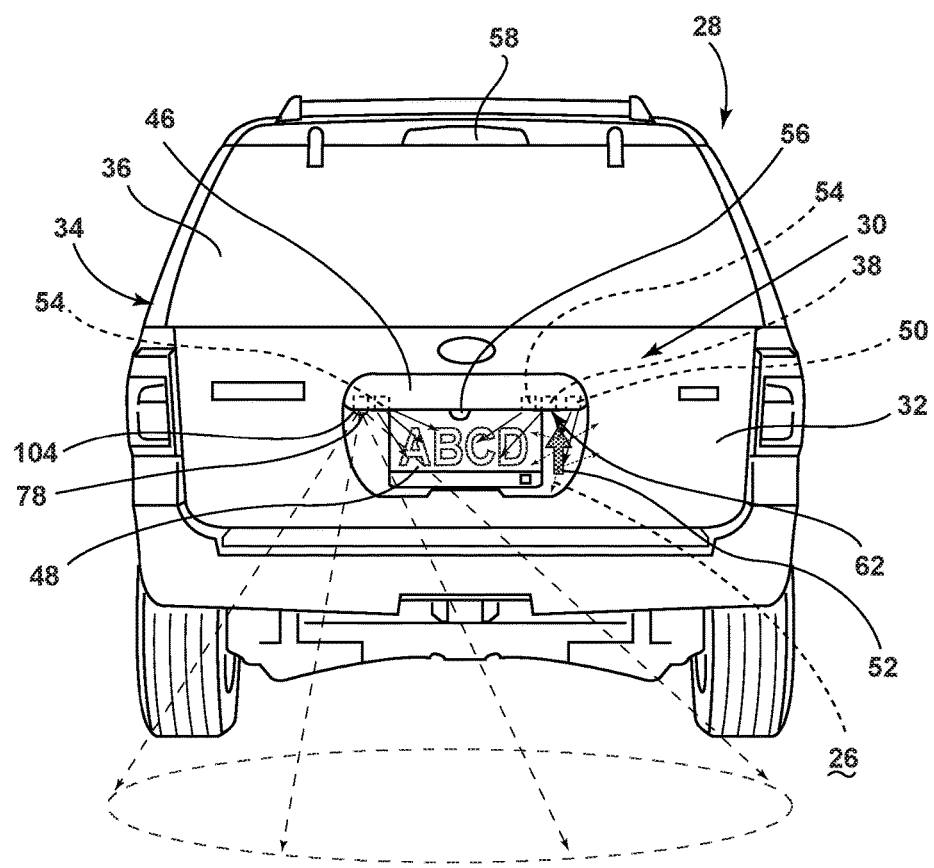
FIG. 9 is a rear perspective view of the vehicle employing the light system having an additional light source that is configured as a puddle lamp, according to one embodiment.

Referring to FIG. 9, the light system 30 may include the light projector 50, the feature light source(s) 54, and/or a lamp that may function as a puddle lamp 104. The puddle lamp 104 is configured to illuminate a portion of the ground disposed proximately to the rear portion of the vehicle 28. The light projector 50, the feature light source(s) 54, and/or the puddle lamp 104 may be independently illuminated based on predefined activities of a user.

Figure 10:
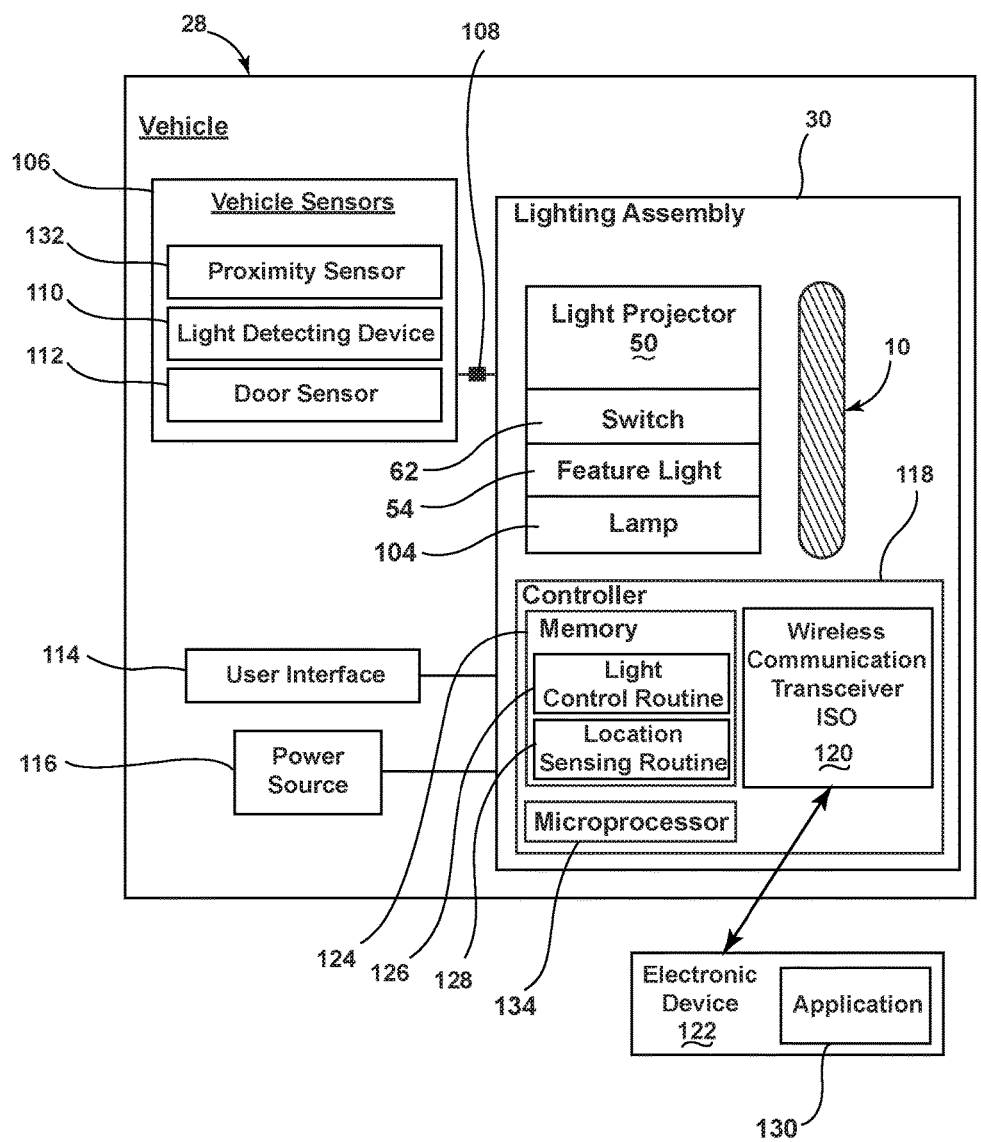
FIG. 10 is a block diagram of the vehicle having the light system employed therein.

Referring to FIG. 10, a block diagram of the vehicle 28 is shown in which the light system 30 is positioned on the vehicle 28. A power source 116 is connected to the light system 30 to provide power to a controller 118. The light system 30, and the vehicle 28, may also be equipped with vehicle equipment 106 that is operably coupled with the controller 118 for initiating the light projector 50, the feature light source(s) 54, and/or the puddle lamp 104.

The vehicle equipment 106 that may be used in conjunction with the light system 30 and may communicate with the light system 30 through a multiplex communication bus 108. The multiplex communication bus 108 may be disposed within the light system 30 and/or the vehicle 28. For example, the vehicle 28 may include a receiver that communicates with the key fob 40, a proximity sensor 132, a light-detecting device 110, a door sensor 112, and/or any other sensor that may be disposed within a vehicle 28.

The light-detecting device 110 may be utilized for varying the intensity of excitation light 24 emitted from the light projector 50, the feature light source(s) 54, and/or the puddle lamp 104. The light-detecting device 110 may be integrated into the vehicle 28 or into the light system 30. The light-detecting device 110 senses the environmental lighting conditions, such as whether the vehicle 28 is in day-like conditions (i.e., higher light level conditions) and/or whether the vehicle 28 is in night-like conditions (i.e., lower light level conditions). The light-detecting device 110 can be of any suitable type, and can detect the day-like and night-like conditions in any suitable fashion. For instance, in one embodiment, the light-detecting device 110 includes a light sensor that detects the amount of light (e.g., solar radiation) affecting the vehicle 28 for determining whether day-like or night-like conditions exist. According to one embodiment, a lower initial intensity of excitation light 24 may be emitted by the light projector 50, the feature light source(s) 54, and/or the puddle lamp 104 when the light-detecting device 110 senses night-like conditions. A higher initial intensity of excitation light 24 may be emitted when the light-detecting device 110 senses day-like conditions.

In operation, the light projector 50, the feature light source(s) 54, and/or the puddle lamp 104 may be activated using a variety of means. For example, the vehicle 28 may include a user interface 114. The user interface 114 may be configured such that a user may control the wavelength of excitation light 24 that is emitted by the light projector 50, the feature light source(s) 54, and/or the puddle lamp 104 and/or the wavelength of light emitted by the light projector 50, the feature light source(s) 54, and/or the puddle lamp 104. Additionally, or alternatively, the user interface 114 may be used to switch the light system 30 through a plurality of modes and/or functions. The user interface 114 may use any type of control known in the art for controlling the light projector 50, the feature light source(s) 54, and/or the puddle lamp 104, such as, but not limited to, switches (e.g., proximity sensors, push-type buttons) and may be disposed in any practicable location.

The light system 30, or the vehicle 28, may further include one or more of the wireless communication transceivers 120 that may be configured to interact with an electronic device 122. The wireless communication transceivers 120 may communicate with the electronic device 122 over a wireless signal (e.g., radio frequency). The electronic device 122 may include a cellphone, a tablet, the key fob 40, wearable device (e.g., fitness band, watch, glasses, jewelry, wallet), apparel (e.g., a tee shirt, gloves, shoes or other accessories), personal digital assistant, headphones and/or other devices capable of wireless transmission (e.g., radio frequency, Bluetooth, ultrasonic).

In one non-limiting example, the wireless communication transceivers 120 may be a Bluetooth™ RN4020 module, or an RN4020 Bluetooth™ low energy PICtail board configured to communicate with the electronic device 122 using Bluetooth™ low energy signals. The wireless communication transceivers 120 may include a transmitter and a receiver to transmit and receive wireless signals (e.g., Bluetooth™ signals) to and from the electronic device 122. It will be appreciated that the wireless communication transceivers 120 may utilize other forms of wireless communication between with the electronic device 122 and other wireless communication transceivers 120, such as Wi-Fi™.

The wireless communication transceivers 120 may be positioned on or within the controller 118. The controller 118 may be a dedicated controller or may be a shared controller (e.g., for multiple light assemblies or light assemblies for other body features). The controller 118 may include a processor 134 and a memory 124 for executing stored routines or for storing information (e.g., related to the operation of the light system 30 and/or the electronic device 122). The wireless communication transceiver 120 is configured to communicate with the processor 134 such that one or more of the routines 126, 128 stored in the memory 124 is activated.

The electronic device 122 may include one or more routines 126, 128, which control the communication between the wireless communication transceiver 120 and the electronic device 122. For example, in cellphone embodiments of the electronic device 122, the cellphone may include one or more applications 130 configured to communicate with the wireless communication transceivers 120. In the depicted embodiment, the memory 124 of the controller 118 includes a light control routine 126 and a location sensing routine 128. In various embodiments, the wireless communication transceiver 120 is a stand alone device that is not in communication with body control modules, electronic control modules, engine control modules and/or other features of the vehicle 28. For example, the wireless communication transceivers 120 may only be capable of communication with the light system 30 and the electronic device 122. In other embodiments, the wireless communication transceivers 120 may communicate with the body controller and/or other onboard controllers.

The vehicle 28 may include a plurality of wireless communication transceivers 120, similar to that described in connection with the light system 30, positioned around the vehicle 28 (e.g., rear, sides, or front of the vehicle 28). The wireless communication transceivers 120 may be in communication with one another or may mutually communicate with a master controller or module (e.g., body control module). The wireless communication transceivers 120 may be disposed within other accessories of the vehicle 28, or may be stand alone units. The electronic device 122 may communicate with all, some, or none of the wireless communication transceivers 120 as the electronic device 122 enters and exits the communication range of the transceivers 120. Each of the wireless communication transceivers 120 may be aware of its location within the vehicle 28 and capable of sharing its location with the electronic device 122.

In various embodiments, the wireless communication transceivers 120 are capable of communicating with the electronic device 122 such that the location of the electronic device 122 may be determined therefrom (e.g., based on signal strength and/or return time of the signal) or vice versa. According to one embodiment, the location sensing routine 128 in the memory 124 of the controller 118 may utilize the signal strength and time to return of the signals between the plurality of wireless communication transceivers 120 and the electronic device 122 to triangulate the position of the electronic device 122 as the occupant moves around inside and/or outside of the vehicle 28. In embodiments where the wireless communication transceivers 120 communicate with a master module, the location of the electronic device 122 may be calculated in the master module. The location of the electronic device 122 may have sufficient resolution to determine which door of the vehicle 28 the occupant is approaching. The electronic device 122 may then share its determined location with the wireless communication transceivers 120 such that appropriate features (e.g., illumination of the light projector 50) may be activated by the appropriate transceivers 120. It will be understood that the location sensing routine 128 may be located on the electronic device 122 and that any location determinations may be made by the electronic device 122 and shared with the wireless communication transceivers 120 without departing from the spirit of this disclosure.

The light control routine 126 may process signals from the wireless communication transceiver 120 (e.g., the location of the electronic device 122) to activate the light system 30. Depending on the signals received from the wireless communication transceiver 120 and/or the vehicle sensors 122, the light control routine 126 may be activated. The light control routine 126 may store a predetermined illumination sequence for the light system 30 based on detected properties of the electronic device 122 (e.g., known or unknown device, location, and user specific data). For example, the light control routine 126 may control the light system 30 to follow the electronic device 122 by activating an illumination sequence based on the position of the electronic devices 122. The electronic device 122 may store user specific data and preferences relating to the light system 30 (e.g., color, intensity, pattern, activation distance, etc.) and/or the memory 124 (e.g., the light control routine 126) may store this data.

The inputs to the controller 118 may include an electronic device 122 door unlock signal 44 which may be made available from another controller, e.g., body control module, within the vehicle 28 in communication with the key fob 40 via wireless communication. Another controller such as a vehicle body control module may supply the distance to user signal. According to other embodiments, the distance to the user signal could be generated using other sensors, such as the proximity sensor 132. The controller 118 further receives a door unlock sensor signal 44. The door unlatch sensor signal may be a signal sensed by the door sensor 112, or may be a signal detected by activation of a sensor on the electronic device 122.

The controller 118 processes the inputs and activates the light system 30 when the electronic device 122 door unlock signal 44 is received by turning the light projector 50, the feature light source(s) 54, and/or the puddle lamp 104 on and off. The controller 118 may activate the light system 30 in response to other signals such as a door unlock signal generated by a door mounted switch or a door open signal, according to other embodiments. The light system 30 may be turned off when a predetermined time period expires or when a user is detected opening a vehicle door via the door unlock sensor signal 44 according to one embodiment. The controller 118 may further determine a distance from the vehicle 28 to a user and may control intensity and/or time of activation for the light projector 50, the feature light source(s) 54, and/or the puddle lamp 104, according to other embodiments.

Choosing which electronic devices 122 should be trusted, and, therefore, given access to command of the controller 118 and/or the wireless communication transceiver 120 (e.g., the light system 30) may be determined based on whether the electronic device 122 has been inside of the vehicle 28 before. The memory of the wireless communication transceivers 120 may store identifying information relating to electronic devices 122 which were detected within the vehicle 28 (e.g., using the location sensing routine 128) and which may therefore be generally regarded as "friendly" and/or as the owner of the vehicle 28.

In an exemplary method of determining that an unknown electronic device 122 is friendly, the wireless communication transceivers 120 detect the presence of an unknown electronic device 122, detect a characteristic signal shift (e.g., attenuation or increase in signal at corresponding wireless communication transceivers 120) indicative of the unknown electronic device 122 entering or being within the vehicle 28 across multiple wireless communication transceivers 120, and store characteristic information about the electronic device 122 for future identification. It will be understood that a determination of the location of the electronic device 122 to be within the vehicle 28 may also prompt a storing of the characteristic information about the electronic device 122 for future identification. Utilizing the past and/or present location of the electronic device 122 as a security feature to determine if it is allowed access to the controller 118 may be particularly advantageous as the replication of signal shifting indicative of the electronic device 122 entering the vehicle 28 and the location of the electronic device 122 is particularly difficult to fake. Further, it will be understood that more conventional methods of connecting electronic devices 122, such as pairing and manually connecting, may also be utilized to designate friendly devices 122.

Integration of vehicle sensors 122 and/or detection of the electronic devices 122 by the wireless communication transceivers 120 may allow for a variety of lighting controls to be affected and illumination sequences to be activated. As described herein, the electronic devices 122 may be used for determining a location of the occupant. Accordingly, the light system 30 may illuminate as an occupant approaches the vehicle 28 and/or uses the tailgate 32.

Detection of location of the electronic device 122 relative to the vehicle 28 also permits the wireless communication transceivers 120 to determine if an unrecognized electronic device 122 is proximate the vehicle 28. Such an unrecognized electronic device 122 may be owned or carried by a potential burglar or threat to the vehicle 28.

In events where an unrecognized electronic device 122 is detected proximate the vehicle 28 for greater than a predetermined time, the wireless communication transceivers 120 may activate one or more countermeasures. Countermeasures may include a strobe light from the light system 30 or directing light from the electronic device 122. In some embodiments, any available identifying information about the electronic device 122 may be stored for later retrieval if the owner of the vehicle's electronic device 122 is not detected proximate the vehicle 28 at the same time. The wireless communication transceivers 120 may store greater than fifty electronic devices 122 that may have been a threat.

With further reference to FIG. 10, in embodiments that include the photoluminescent structure 10, the photoluminescent structure 10 may exhibit a constant unicolor or multicolor illumination. For example, the controller 118 may prompt the projector light source 66 to emit only a first wavelength of excitation light 24 to cause the photoluminescent structure 10 to luminesce in the first color (e.g., white). Alternatively, the controller 118 may prompt the projector light source 66 to emit only a second wavelength of excitation light 24 to cause the photoluminescent structure 10 to luminesce in the second color (e.g., blue). Alternatively still, the controller 118 may prompt the projector light source 66 to simultaneously emit the first and second wavelengths of excitation light 24 to cause the photoluminescent structures 10 to luminesce in a third color (e.g., light blue) defined by an additive light mixture of the first and second colors. Moreover, additional photoluminescent structures 10 may be added to the light system 30 that convert the excitation light 24 emitted from the projector light source 66 to a different wavelength. Alternatively still, the controller 118 may prompt the projector light source 66 to alternate between periodically emitting the first and second wavelengths of excitation light 24 to cause the photoluminescent structure 10 to periodically luminesce by alternating between the first and second colors of converted light 26. The controller 118 may prompt the projector light source 66 to periodically emit the first and/or second wavelengths of excitation light 24 at a regular time interval and/or an irregular time interval.

With respect to the above examples, the controller 118 may modify the intensity of the emitted first and second wavelengths of excitation light 24 by pulse-width modulation or current control. In some embodiments, the controller 118 may be configured to adjust a color of the converted light 26 by sending control signals to adjust an intensity or energy output level of the projector light source 66. For example, if the projector light source 66 is configured to output the excitation light 24 at a low level, substantially all of the excitation light 24 may be converted to the outputted, visible converted light 26. If the projector light source 66 is configured to emit excitation light 24 at a high level, only a portion of the excitation light 24 may be converted to the converted light 26 by the photoluminescent structure 10. In this configuration, a color of light corresponding to mixture of the excitation light 24 and the converted light 26 may be output as the outputted light.

Though a low level and a high level of intensity are discussed in reference to the excitation light 24, it shall be understood that the intensity of the excitation light 24 may be varied among a variety of intensity levels to adjust a hue of the color corresponding to the emitted excitation and/or converted light 24, 26 from the light system 30. As described herein, the color of the converted light 26 may be significantly dependent on the particular photoluminescent material 18 utilized in the photoluminescent structure 10. Additionally, a conversion capacity of the photoluminescent structure 10 may be significantly dependent on a concentration of the photoluminescent structures 10 utilized in the photoluminescent structure 10. By adjusting the range of intensities that may be emitted from the projector light source 66, the concentration and proportions of the photoluminescent materials 18 in the photoluminescent structure 10 and the types of photoluminescent materials 18 utilized in the photoluminescent structure 10 discussed herein may be operable to generate a range of color hues of outputted light by blending the excitation light 24 with the converted light 26. It is also contemplated that the intensity of the projector light source 66 may be varied simultaneously, or independently, from any number of other light sources.

A variety of advantages may be derived from the use of the present disclosure. For example, use of the disclosed light system 30 may provide assistance in locating a substantially concealed feature of the vehicle 28. Further, use of the wireless communication transceivers 120 allows for the light system 30 to be activated as a person approaches. Further, due to the low package space requirements of the light system 30, the light system 30 may be adhesively disposed within a wide range of housings 46 and/or trim pieces disposed within the vehicle 28 and/or on the exterior portion of the vehicle 28. Finally, use of the wireless communication transceivers 120 allows for a low consumption of power from the vehicle 28 while the vehicle 28 is not in use.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited, to physically mateable and/or physically interacting components and/or wirelessly interactable and/or wirelessly interacting components and/or logically interacting and/or logically interactable components.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vehicle comprising:
 a trim housing disposed on a liftgate of the vehicle and at least partially concealing a latch; and
 a light projector disposed within the trim housing and configured to illuminate a lighted image pattern separate from the trim housing on a surface of the vehicle, wherein the image pattern is configured to provide assistance in locating the latch.

2. The vehicle of claim 1, wherein the image pattern is formed from an image filter.

3. The vehicle of claim 1, wherein the image pattern is defined by a photoluminescent structure that includes at least one photoluminescent material therein that is configured to convert an excitation light received from at least a portion of a light source into a visible, converted light.

4. The vehicle of claim 1, wherein the image pattern is an arrow that is pointed towards a vehicle switch.

5. The vehicle of claim 1, wherein the latch is configured to release the tailgate such that the tailgate may be moved between a plurality of positions.

6. The vehicle claim 1, further comprising:
 a controller for controlling an activation state of the light projector in response to one or more inputs.

7. A vehicle light system comprising:
 a trim housing on a rear portion of a vehicle;
 an actuable vehicle feature and a first light source disposed within the housing;
 a membrane disposed over the vehicle feature and the first light source, wherein the first light source illuminates an image pattern separately disposed on the rear portion of the vehicle to assist in locating the vehicle feature.

8. The vehicle light system of claim 7, wherein the membrane further includes an image filter therein that outputs the image pattern onto a surface of the vehicle.

9. The vehicle light system of claim 8, further comprising:
 a photoluminescent structure within the image filter and configured to luminesce in response to receiving excitation light emitted by the first light source.

10. The vehicle light system of claim 7, further comprising:
 a second light source configured to illuminate a second vehicle feature.

11. The vehicle light system of claim 10, further comprising:
 a third light source configured to illuminate a portion of the ground proximate to the vehicle.

12. The vehicle light system of claim 7, further comprising:
 a photoluminescent structure disposed on a surface of the vehicle and configured to luminesce in response to receiving excitation light that is emitted form the first light source.

13. The vehicle light system of claim 7, wherein the first light source is illuminated as an occupant approaches the vehicle.

14. The vehicle light system of claim 7, wherein the first light source emits one of a blue light, violet light, IR light, or a UV light.

15. A light system for a vehicle comprising:
 a housing attached to a vehicle structure on a rear portion of the vehicle;
 a light source disposed within the housing and configured to generate an image pattern outside of the housing; and
 a vehicle feature disposed within and partially concealed by the housing, wherein the image pattern notifies a user of the vehicle feature location.

16. The light system of claim 15, wherein the vehicle feature is a latch that is operably coupled with a latch mechanism for releasing a door of the vehicle.

17. The light system of claim 15, wherein the vehicle feature is a button that is operably coupled within a locking system of the vehicle.

18. The light system of claim 15, wherein the light source emits excitation light causing a photoluminescent structure to luminesce in response to receiving the excitation light, the photoluminescent structure disposed on the vehicle structure.

19. The light system of claim 15, further comprising:
 a controller operably coupled with the light source for controlling an activation state of the light source in response to receiving an input from a key fob.

20. The light system of claim 15, further comprising:
 a controller operably coupled with the light source and an electronic device for controlling an activation state of the light source when the electronic device is disposed proximately to the vehicle.

* * * * *